United States Patent [19]

Musacchia, Jr.

[11] Patent Number: 4,722,642
[45] Date of Patent: Feb. 2, 1988

[54] SPACING SHIM FOR INDEXABLE TOOLS

[76] Inventor: James E. Musacchia, Jr., Rte. 7, Box 579A, Piedmont, S.C. 29673

[21] Appl. No.: 4,302

[22] Filed: Jan. 8, 1987

Related U.S. Application Data

[63] Continuation-in-part of Ser. No. 851,551, Apr. 14, 1986, abandoned.

[51] Int. Cl.⁴ .............................................. B23P 15/28
[52] U.S. Cl. .................................... 407/85; 407/104; 407/107
[58] Field of Search ....................... 407/37, 38, 39, 45, 407/46, 68, 76, 85, 88, 101, 103, 104, 105, 106, 107, 113, 120

[56] References Cited

U.S. PATENT DOCUMENTS

| | | | |
|---|---|---|---|
| 2,171,694 | 9/1939 | Harje | 407/85 |
| 2,296,597 | 9/1942 | Carr | 407/85 |
| 2,332,449 | 10/1943 | Kouschpil | 407/85 |
| 2,430,844 | 11/1947 | Colwell | 407/85 |
| 2,982,008 | 5/1961 | Facknitz | 407/112 |
| 3,172,190 | 3/1965 | Beach | 407/85 |
| 3,175,276 | 3/1965 | Weber et al. | 407/113 |
| 3,268,978 | 8/1966 | Reck | 407/104 |
| 3,289,272 | 12/1966 | Stier | 407/113 |
| 3,376,763 | 4/1968 | Welles | 407/120 |
| 3,576,060 | 4/1971 | Stein | 407/118 |
| 3,672,016 | 6/1972 | Melinder | 407/104 |
| 3,703,755 | 11/1971 | Guensche | 407/112 |
| 3,757,397 | 9/1973 | Lindsay | 407/46 |

FOREIGN PATENT DOCUMENTS

| | | | |
|---|---|---|---|
| 2300229 | 7/1973 | Fed. Rep. of Germany | 407/85 |
| 341697 | 11/1959 | Switzerland | 407/99 |

OTHER PUBLICATIONS

Carboloy Inserts Catalog, p. 15, Oct. 15, 1979, General Electric.
Carboly Catalog, Jul. 15, 1965, p. 37.

Primary Examiner—Nicholas P. Godici
Assistant Examiner—Edward Brown
Attorney, Agent, or Firm—Julian W. Dority

[57] ABSTRACT

An indexable cutting tool wherein wear-resistant inserts are removably supported within a recess in a tool holder which has walls generally conforming to the adjacent surfaces of the insert. Interposed between the adjacent surfaces of the insert and the walls of the recess is a spacing shim with at least two portions which separate the insert from the walls of the recess. The portions which separate the inserts from the walls of the recess are connected by a weakened portion which may be scored or reduced in dimenson. The shim, as manufactured, is flat with the weakened portions connecting the portions adapted to separate the insert from the recess walls being provided to permit the shim to conform to a variety of insert configurations. The portions of the shim which separate the surfaces of the insert from the walls of the recess have a thickness which is equal to the amount of material removed from the surfaces of the insert in one or more resharpening operations.

18 Claims, 9 Drawing Figures

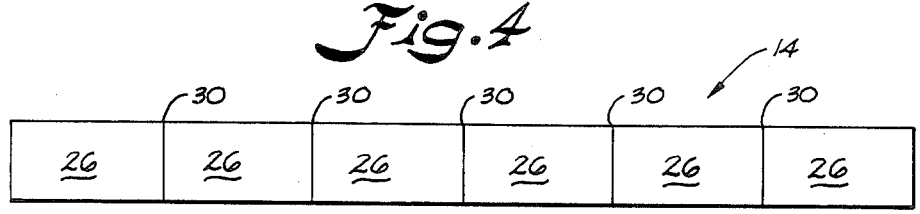
Fig. 4
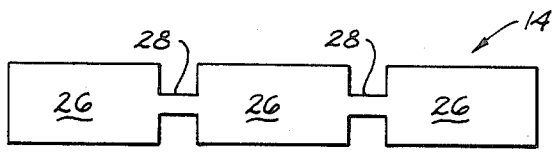
Fig. 5
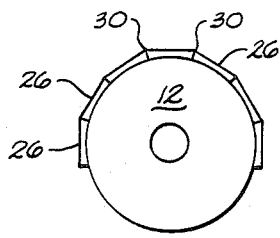 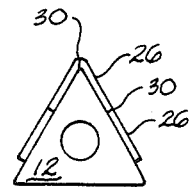
Fig. 6   Fig. 7
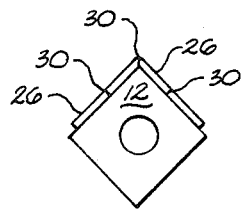 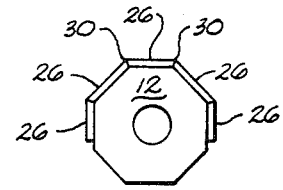
Fig. 8   Fig. 9

SPACING SHIM FOR INDEXABLE TOOLS

BACKGROUND OF THE INVENTION

This application is a continuation in part of my copending application Ser. No. 06/851,551 filed on Apr. 14, 1986, and now abandoned for spacing shim for indexable tools.

This invention relates to spacing shims for indexable cutting tools such as milling machines and turning centers which are equipped with wear-resistant cutting inserts that are removably supported in a recess on tool holders.

In a common construction, the wear-resistant insert may be diamond shaped with two adjacent sides of the diamond shaped insert supported in a recess having a shape which conforms to the shape of the insert. In this construction, the cutting surfaces of the insert protrudes beyond the tool holder a predetermined amount. After the cutting surfaces of the insert have become worn, it becomes necessary to remove the insert from the tool holder and grind the cutting surfaces of the insert back to their original angle and shape. In the past when this has been done, it has been necessary to change the tool holder since the tool holder recess no longer conforms to the shape of the insert. This means that the owner of the milling machine has to stock a plurality of tool holders to enable him to use the wear-resistant inserts after they have been worn and resharpened.

It has also been found that when grinding a cutting insert, it has become necessary to grind it to the next increment, producing a new radius and dimension on the insert. In many instances, this may require that the inserts be ground as much as 125 thousands of an inch. Therefore the inserts used heretofore have had a limited life span.

In the above identified application, I have disclosed a spacing shim for indexable tools which overcomes the problems noted above. In the invention of that application, the spacing shim is preformed to conform to the shape of the wear-resistant insert, i.e., if the insert is diamond shaped, the shim will be preshaped to conform to the diamond shape of the insert, or if the insert is square, the shim will be preshaped to have portions extend at 90° angles to each other. In view of the necessity to preshape the shims of the invention in the parent application, it has been necessary for the operators of such cutting tools to stock a variety of configurations to match the configuration of the inserts in use within their plant. Therefore, this has required the operator to purchase a large inventory of spacing shims.

SUMMARY OF THE INVENTION

The apparatus constructed in accordance with the present invention is a flat shim which is deformable to conform to a variety of insert configurations in an indexable cutting tool.

In such tools, a wear-resistant insert is supported in a recess on the tool holder and the recess has surfaces which conform to the adjacent surfaces on the insert. The insert is removably held in place in the recess and a spacing shim is provided, interposed between the adjacent surfaces of the insert and the walls of the recess. The shim has a thickness which corresponds to the amount of material removed from the surfaces of the insert when the insert is resharpened by grinding. The spacing shim of the invention has a flat configuration which is deformable to conform to configuration of a variety of insert shapes. The use of the spacing shims of the present invention enables the insert to continue to be used in the same insert holder after successive sharpening of the insert. The shim of the invention also enables the operator of the tool to stock one type of shim for a variety of insert configurations.

It is to be understood that the shim of the invention may come in different thicknesses, each of which will correspond to the amount of material removed from a wear-resistant insert during the sharpening operation. For example, on the first resharpening operation, 15 thousands of an inch of material may be ground from the surface of the inserts and a shim having 15 thousands of an inch thickness will be used after the first resharpening operation has taken place. After the second resharpening operation, which may also remove 15 thousands of an inch of material from the surfaces of the wear-resistant inserts, a shim having a thickness of 30 thousands of an inch will be used and so on until the insert is no longer useful. However, the same insert holder can be used after each successive resharpening of the insert.

Accordingly, it is an important object of the present invention to provide a flat deformable spacing shim for an indexable cutting tool wherein the wear-resistant inserts may be resharpened without the necessity of changing the insert holder.

Another important object of the present invention is to provide flat spacer shims with preformed weakened sections which permit the flat shim to conform to the configuration of a variety of wear-resistant inserts.

BRIEF DESCRIPTION OF THE DRAWINGS

The invention will be more readily understood from a reading of the following specification, and by reference to the accompanying drawings, forming an integral part thereof, wherein an example of the invention is shown, and wherein:

FIG. 4 is a diagrammatic plan view of a second embodiment of the shim of the invention;

FIG. 5 is a diagrammatic plan view of a third embodiment of the shim of the invention;

FIG. 6 is a diagrammatic plan view of a circular insert with the shim of the invention;

FIG. 7 is a diagrammatic plan view of a triangular insert with the shim of the invention;

FIG. 8 is a diagrammatic plan view of a diamond shaped insert with the shim of the invention; and FIG. 9 is a diagrammatic plan view of a hexagonal insert with the shim of the invention.

DETAILED DESCRIPTION OF THE INVENTION

Figure 1:
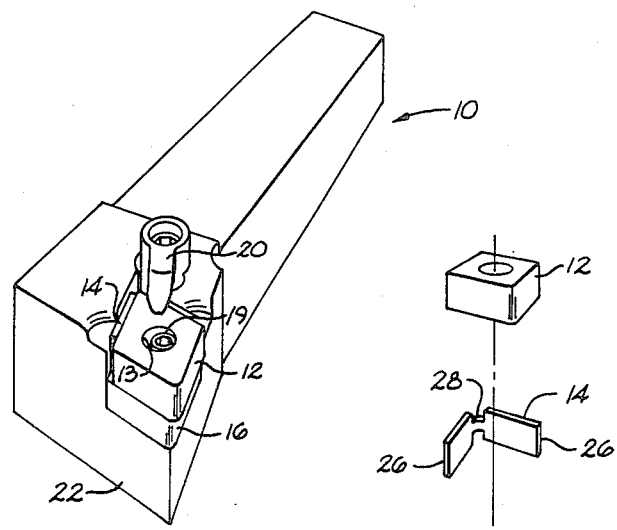
FIG. 1 is a perspective view illustrating a cutting tool constructed in accordance with the present invention.
Figure 2:
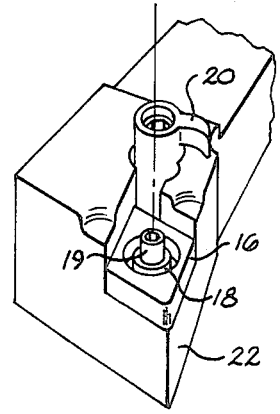
FIG. 2 is an exploded prospective view illustrating the cutting tool of FIG. 1 in more detail.

Referring now to FIGS. 1 and 2 of the drawings wherein is illustrated an indexable cutting tool 10 which is adapted to be used with a milling machine. Tool 10 includes an insert holder 22, with an insert recess 24 provided at one corner of the tool holder.

Fitted within recess 24 is a wear-resistant cutting insert 12 which is removably supported within recess 24 by support pad 16. Interposed between the vertical walls of recess 24 and the vertical surfaces of insert 12 is a spacing shim 14. Shim 14 separates insert 12 from contact with the vertical walls of recess 24. Insert 12 is provided with an opening 13 which fits about an insert locking screw 18. Screw 18 has an offset locking projection 19 which extends through opening 13 in the insert. When the insert is placed within recess 24, about locking projection 19, the insert locking screw 18 is rotated 180°, which causes the offset projection 19 to cam or press the insert and shim 14 against the vertical walls of recess 24.

Insert holder 22 is also provided with an insert retainer 20 which is held in place on the insert holder by suitable screw means (not shown), and the retainer has a portion which extends across the top of a portion of the insert and holds it in place within recess 24. Retainer 20 is not tightened into place until the insert and the shim are cammed into abutting contact with the vertical walls of the recess. The vertical surfaces of the insert do not contact the vertical walls of recess 24, when shim 14 is used.

When the cutting tool illustrated in FIGS. 1 and 2 has a new insert placed in it, shim 14 is not necessary and is not used. However, during use of the cutting tool, the cutting surfaces of insert 12 become worn and it becomes necessary to grind a small part of the surfaces on insert 12 away in order to sharpen the insert. When this is done, all four surfaces of the insert must be ground so as to retain the correct angles of the insert.

Figure 3:
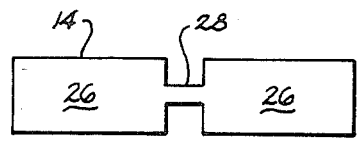
FIG. 3 is a diagrammatic plan view of a first embodiment of the shim of the invention.

Refer now to FIG. 3 wherein the structure of the shim of the invention is illustrated. As seen in FIG. 3, shim 14 is furnished in the flattened state and comprises insert supporting portions 26 connected by a reduced portion 28 having a thickness of not more than 0.010 inch. The thickness of the supporting portions 26 would normally range from 0.025 to 0.100 of an inch. Such permits bending at the reduced portion 28. In use as seen in FIGS. 1 and 2, shim 14 is deformed by bending portion 28 to permit portions 26 to conform to the vertical surface configuration of insert 12. The structure shown in FIG. 3 is the simplest form of the shim of the invention and contains only two supporting portions 26 and one reduced portion 28. This is a form of the shim utilized in the tool illustrated in FIGS. 1 and 2.

However, at times the inserts have configurations which require more reduced areas 28 in order to permit the shim supporting portions 26 to conform with the supported surfaces of the insert. As is seen in FIG. 3, there may be two or more of the reduced portions 28 separated by the supporting portions 26.

FIG. 5 illustrates a third embodiment of the shim of the invention. In this embodiment, supported portions 26 are separated by reduced portions 30, having a thickness not to exceed 0.010 inch. In this instance, the reduced portions 30 are constituted by scoring which provides a preselected fold line to permit the shim of the invention to conform to a variety of insert shapes and sizes. As seen in FIGS. 6, 7, 8 and 9, a shim with a multiplicity of score lines 30 may be used to support inserts that have a circular configuration, a triangular configuration, a diamond configuration, a hexagonal configuration or any other configuration that may become necessary.

The inserts, themselves, may be made of any wear-resistant material such as titanium carbide, coated carbide ceramics, or the like, available for use in tools of this type.

The shim of the present invention is made of a heat treated alloy steel within the tolerances of the manufacturing standards for industrial tools.

It will be understood, of course, that while the form of the invention, herein shown and described, constitutes the preferred embodiment of the invention, it is not intended to illustrate all possible forms of the invention. It will also be understood the words used herein are words of description rather than of limitation and that various changes may be made without departing from the spirit and/or the scope of the invention herein disclosed and illustrated.

What is claimed is:

1. An indexable cutting tool, comprising:
   (a) a used, resharpened wear-resistant insert having a cutting surface and at least two supported surfaces;
   (b) an insert holder for holding and supporting said insert and having a recess with a configuration which generally conforms to the configurations of the supported surfaces of said insert; and
   (c) a flat shim having a plurality of flat portions interposed between supported surfaces of said insert and the conforming surfaces of said recess and a portion having a reduced thickness interposed between and connecting said plurality of flat surfaces whereby said flat surfaces conform to the surfaces of said insert and said recess when such surfaces lie in intersecting planes and said flat surfaces have a thickness equal to the material removed in previous sharpening of said insert.

2. An indexable cutting tool as set forth in claim 1, wherein said insert has at least three supported surfaces.

3. An indexable cutting tool as set forth in claim 1, wherein said insert is diamond shaped.

4. An indexable cutting tool as set forth in claim 1, wherein said insert has a square configuration.

5. An indexable cutting tool as set forth in claim 1, wherein said insert has a triangular configuration.

6. An indexable cutting tool as set forth in claim 1, wherein said insert has a circular configuration.

7. An indexable cutting tool as set forth in claim 1, wherein said insert has a hexagonal configuration.

8. An indexable cutting tool as set forth in claim 1, wherein said portion having a reduced thickness is not more than 0.010 inch in thickness.

9. An indexable cutting tool as set forth in claim 1, wherein said reduced portion of said shim has been scored.

10. An indexable cutting tool as set forth in claim 1, wherein said shim has more than one reduced portion.

11. A flat shim for use in an indexable cutting tool having a used wear-resistant insert supported in a recess on a holder, which recess conforms to the configuration of, and supports at least two surfaces of said insert, said shim comprising:
   (a) a plurality of flat portions adapted to be interposed between the supported surfaces of said insert and the surfaces of said recess; and
   (b) a reduced thickness portion interposed between each of said flat portions which is susceptible to deformation from pressure to permit said shim to conform to any one of a variety of insert and recess configurations, said shim having a thickness which is equal to the material removed from said insert in previous sharpening operations.

12. A flat shim as set forth in claim 11, wherein said reduced portion has a thickness of not more than 0.010 inches.

13. A flat shim as set forth in claim 11, wherein said reduced portion comprises a reduction of the thickness of the shim in a score line.

14. A flat shim as set forth in claim 11, wherein said reduced portion has a width which is narrower than the said flat portions.

15. A flat shim for use in an indexable cutting tool where said tool comprises a wear-resistant insert supported in a recess on a holder, which recess conforms to the configuration of, and supports at least two surfaces of said insert, said shim comprising:
(a) a first portion adapted to be interposed between one of the supported surfaces of said insert and a surface of said recess;
(b) a second portion adapted to be interposed between another of the supported surfaces of said insert and another surface of said recess; and
(c) a reduced thickness portion connecting said first and second portion which is susceptible to deformation under pressure to permit said first and second portions of said shim to conform to surfaces of said insert and said recess which lie in intersecting planes.

16. A flat shim as set forth in claim 15, wherein said shim has a plurality of portions adapted to be interposed between said inserts and said recess and a plurality of reduced portions connecting said interposed portions.

17. A flat shim as set forth in claim 15, wherein said reduced portion has a thickness of not more than 0.010 inch.

18. A flat shim as set forth in claim 15, wherein said reduced portion comprises a scoring of the shim.

* * * * *